Nov. 21, 1933.                O. N. OLSON                1,935,986
                          BATTERY TERMINAL CLAMP
                           Filed June 22, 1932
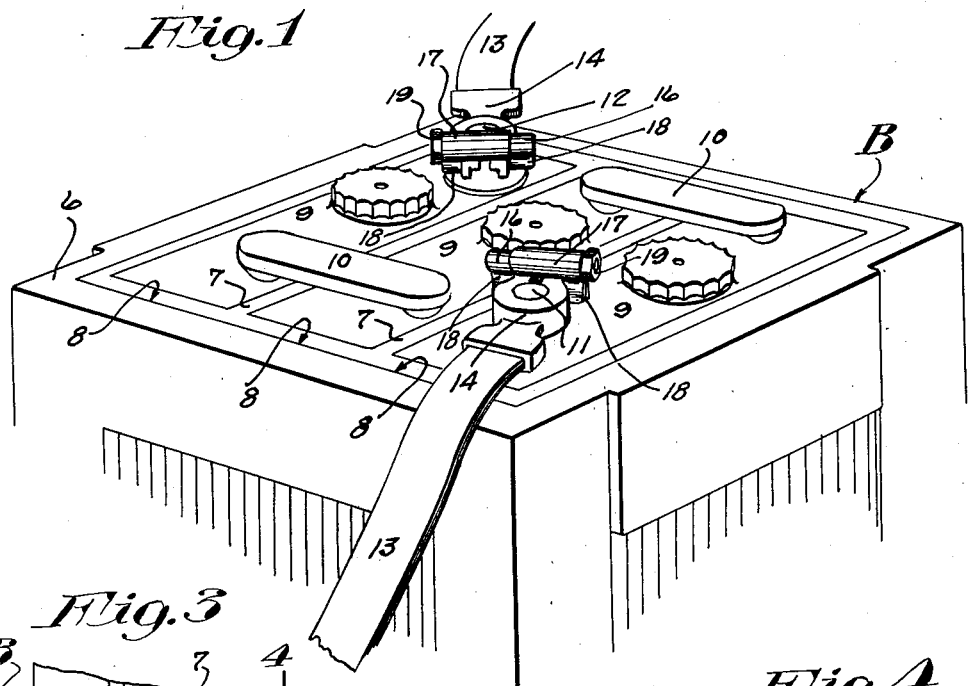
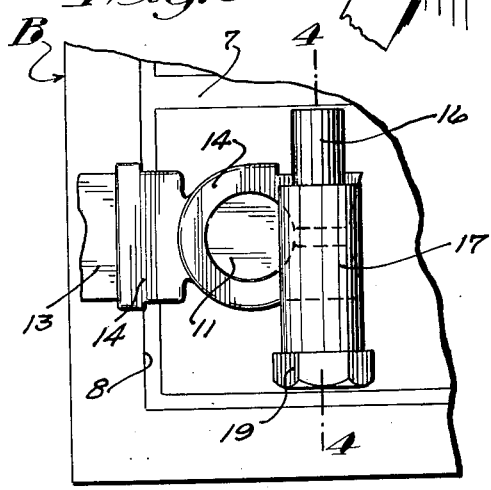
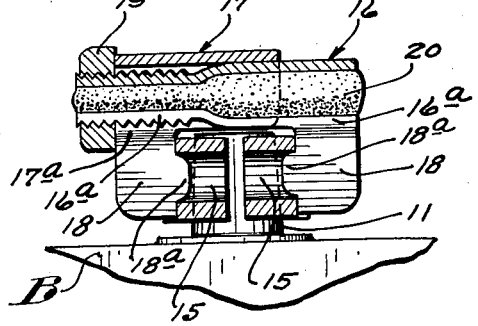
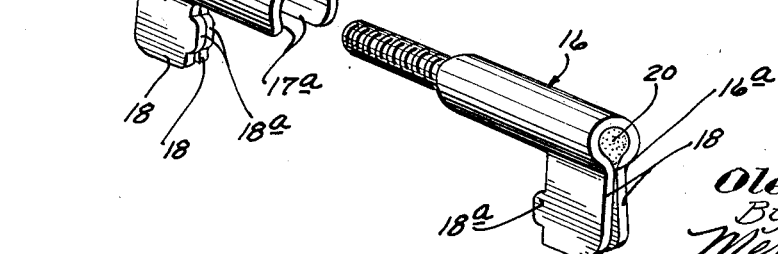
Inventor
Ole N. Olson
By his Attorneys
Merchant & Kilgore Patented Nov. 21, 1933

1,935,986

UNITED STATES PATENT OFFICE 1,935,986

BATTERY TERMINAL CLAMP

Ole N. Olson, Moorhead, Minn.

Application June 22, 1932. Serial No. 618,591

4 Claims. (Cl. 173—259)

My present invention relates to improved clamping devices for use in connection with storage battery terminals and the like and, generally stated, has for its object the provision of an extremely simple, inexpensive and highly efficient device of the class described.

Storage batteries of the type employed in automotive vehicles and the like are usually provided with terminal posts to which connection is usually made through battery leads equipped with bifurcated terminal heads that are inserted over the battery terminal posts. These terminal heads are usually provided at their bifurcated ends with aligned apertures and said heads are customarily brought into clamping engagement with the terminal posts by means of nut-equipped bolts passed through the aligned apertures in the bifurcated portions of the terminal heads.

As is well-known, corrosion often sets in between the positive terminal post of the battery and the positive lead terminal head and this corrosion often attacks the customary clamping bolt and nut and renders loosening of the clamping nut and removal of the terminal head from the terminal post very difficult. In fact in many instances the nut and bolt will become so seriously damaged by corrosion, that attempts to loosen the nut from the clamping bolt will result in serious damage to the battery, such damage, for example, as twisting off of the terminal post or breaking in an underlying battery cell cover.

My improved clamping devices replace the customary nut-equipped bolt and, as will hereinafter be made apparent, are much more easily accessible than the ordinary nut-equipped bolt, are not easily affected by corrosion about the battery terminal and in fact eliminate substantially all of the difficulties hitherto experienced when the customary nut-equipped bolt or the like were employed.

As an important feature of this invention the clamps, which in their preferred forms are made up of telescoped inner and outer split tubular members, that usually extend above cooperating terminal head posts and are equipped with depending clamping lugs, are provided within the inner tubular members with wicks soaked in suitable corrosion eliminating or resisting substance, such as petroleum oil. Corrosion resisting substance from these wicks works through the split in the inner and outer tubular members and produces a corrosion resisting film over the terminal heads, posts and the lugs of the clamps thereby substantially eliminating hitherto bothersome corrosion.

In the accompanying drawing, which illustrates the invention, like characters indicate like parts throughout the several views.

Referring to the drawing:

Fig. 1 is a fragmentary perspective view of an ordinary storage battery incorporating the improved clamps of the invention;

Fig. 2 is a perspective view illustrating the various parts of the clamp in segregated relation;

Fig. 3 is an enlarged fragmentary plan view; and

Fig. 4 is a fragmentary sectional view taken on the line 4—4 of Fig. 3.

The storage battery, here illustrated, is indicated as an entirety by the letter B and includes a case 6 formed with partitions 7 that divide the same into a plurality of cells 8. Each cell 8 of the battery is closed in the customary manner by a cover 9 and said cells are connected in series by connectors 10. The positive terminal post of the battery is indicated by 11 and the negative terminal post thereof is indicated by 12. The cable leads connecting to the terminal posts 11 and 12, respectively, are indicated by 13, the bifurcated terminal heads thereof by 14 and the aligned apertures in the bifurcated end portions thereof by 15.

The clamps in their improved form illustrated each include telescopically engaged inner and outer split tubular members 16 and 17, respectively, each of which is formed near one end with a radially projecting pair of parallel lugs 18 that extend from opposite edges of the splits. The inner tubular member 16 projects completely through and beyond the lug-equipped tubular member 17 and is externally screw-threaded near its projected end to receive a clamping nut 19 that re-acts against the lug-equipped end of the tubular member 17. The split in the inner tubular member 16, indicated by 16ª, is substantially closed throughout the length thereof but the split in the outer tubular member 17, indicated by 17ª, while substantially closed between its lugs 18 is widened out beyond said lugs to receive the lugs of the inner tubular member 16. The pairs of lugs 18 of the inner and outer tubular members 16 and 17 are normally in endwise opposed relation and are formed at their opposing ends with centering projections 18ª.

In use the telescoped tubular members overlie a cooperating terminal head; the lugs 18 of the opposite pairs of lugs engage opposite outside portions of the bifurcated terminal head; the lug projections 18ª of opposite pairs of lugs 18 extend into opposite ends of the aligned apertures 15 to thereby center the lugs in respect to the terminal head; and a desired degree of clamping pressure is exerted upon the terminal head through the clamping lugs 18 by means of the clamping nut 19.

From the foregoing it will be evident that substantially any degree of clamping pressure can be exerted upon the bifurcated terminal head by means of the improved clamps; that the nut 19 being located considerably above the top of the battery and the terminal head may be conveniently and easily manipulated by means of a suitable wrench or pliers without danger of breaking or underlying a cell cover; and further that the nut 19 being located at some distance from an associated terminal head will not often, if ever, be affected by corrosion that may form about the terminal head and post and may therefore be so easily removed that danger of twisting off the terminal post will be eliminated.

It will still further be evident that the clamps being formed of flat sheet metal will be very inexpensive to produce and that due to the tubular forms of their main bodies and the relatively great depth of their lugs, said clamps will be exceedingly rigid.

It is, of course, desirable to eliminate or reduce corrosion to a minimum and to this end I provide the inner tubular member 16 of each clamp with an oil soaked wick 20 that extends substantially from end to end thereof. Oil from these wicks 20 gradually works through the splits 16ª and 17ª in the inner and outer tubular members 16 and 17, respectively, between the parallel lugs and through opposite ends of the tubular members to the underlying terminal heads and posts and the lugs 18 of the clamps and produces a film thereover that is highly resistant to corrosion. This oil also works in between the nut 19 and the threads of the inner tubular member thereby keeping the same lubricated and protected from possible corrosion. It will, of course, be evident that the wicks 20, while referred to as oil soaked wicks, may be treated with any suitable corrosion resisting substance.

What I claim is:

1. A battery terminal clamp comprising inner and outer telescopically engaged split tubular members each being provided with a pair of parallel lugs that project radially from opposite sides of the split therein, the lugs in the inner and outer tubular members normally being in opposed spaced relation and being adapted and arranged to engage opposite sides of a terminal head, and means for drawing the telescoped members into increased telescopic engagement to thereby draw the opposed pairs of lugs into tight clamping engagement with opposite sides of a terminal head.

2. The structure defined in claim 1 in which said last noted means is in the form of a nut having screw-threaded engagement with the inner tubular member and re-acting against the outer thereof.

3. The structure defined in claim 1 in further combination with a wick soaked in corrosion resisting substance and located within the inner tubular member.

4. The structure defined in claim 1 in further combination with an oil soaked wick within the inner tubular member and from which oil will seep through the splits in the tubular members to the said lugs and engaged terminal.

OLE N. OLSON.